(12) United States Patent
Alexander et al.

(10) Patent No.: US 11,220,196 B1
(45) Date of Patent: Jan. 11, 2022

(54) MULTI-LAYER TEXTILE SEAT FOR DYNAMIC CONDITIONS

(71) Applicant: GM GLOBAL TECHNOLOGY OPERATIONS LLC, Detroit, MI (US)

(72) Inventors: Paul W. Alexander, Ypsilanti, MI (US); Nancy L. Johnson, Northville, MI (US); Daniel W. Booth, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/024,849

(22) Filed: Sep. 18, 2020

(51) Int. Cl.
*B60N 2/72* (2006.01)
*B60N 2/58* (2006.01)
*B60N 2/50* (2006.01)
*B60N 2/70* (2006.01)

(52) U.S. Cl.
CPC ............... *B60N 2/72* (2013.01); *B60N 2/503* (2013.01); *B60N 2/5816* (2013.01); *B60N 2/7011* (2013.01)

(58) Field of Classification Search
CPC ..... B60N 2/7011; B60N 2/7029; A47C 23/20; A47C 23/16; A47C 23/18
See application file for complete search history.

(56) References Cited

U.S. PATENT DOCUMENTS

| | | | | |
|---|---|---|---|---|
| 6,817,674 | B2 * | 11/2004 | Fujita | B60N 2/686 297/452.48 |
| 2014/0250603 | A1 * | 9/2014 | Wang | A61G 7/0573 5/724 |
| 2019/0255976 | A1 * | 8/2019 | Katoh | B60N 2/544 |

FOREIGN PATENT DOCUMENTS

| | | | | |
|---|---|---|---|---|
| DE | 3341389 A1 * | 5/1985 | | B60N 2/66 |
| DE | 102016104909 A1 * | 10/2016 | | B60N 2/565 |
| DE | 102017118025 A1 * | 2/2018 | | B60N 2/7094 |
| DE | 102017125488 A1 * | 5/2018 | | B60N 2/64 |
| EP | 3279032 A1 * | 2/2018 | | B60N 2/64 |

\* cited by examiner

*Primary Examiner* — Timothy J Brindley
(74) *Attorney, Agent, or Firm* — Quinn IP Law (57) ABSTRACT

A vehicle seat includes a seat base and a seatback coupled to the seat base. The seatback includes a rigid frame, a first textile layer attached to the rigid frame, a second textile layer attached to the rigid frame, and at least one textile interconnecting tube coupling the first textile layer to the second textile layer. The textile interconnecting tube is attached in tension between the first textile layer and the second textile layer to dampen dynamic loads applied to the seatback. Instead of (or in addition to) the textile interconnecting tube, the seatback may include a plurality of tension elements interconnecting the first textile layer and the second textile layer.

17 Claims, 13 Drawing Sheets

MULTI-LAYER TEXTILE SEAT FOR DYNAMIC CONDITIONS

TECHNICAL FIELD

The present disclosure generally relates to a vehicle seat and, more particularly, to a multi-layer textile seat for dynamic conditions and more broadly to suspension systems interacting with bodies experiencing dynamic motion or excitations.

INTRODUCTION

Vehicles, such as cars, usually include a passenger compartment and seats inside the passenger compartment. The passengers sit on the seat inside the passenger compartment. When the vehicle is subjected to dynamic load, the passenger seated on the seats in turn apply dynamic loads to the seats. In some seats, the seats exhibit a trampoline-like behavior during vehicle jounce and when the vehicle drives through rough road conditions.

It is therefore desirable to develop a vehicle seat capable of broader and better dynamic performance than other vehicle seats. To do so, the presently disclosed vehicle seat include tensioned, interconnected multi-layer textiles that provide more design flexibility and construction. The presently disclosed vehicle seat may include foam or other compliant material attached to its frame to improve settling of the textile vibrations. This vehicle seat includes suspension layers for vehicle seats or seats used in other industries.

The presently disclosed vehicle seats may be manufactured using 3D knitting process to enable the fabrication of textiles with connecting elements between layers. When the textile layers are tensioned as a suspension layer, the textile layers behave in a more controllable and tunable manner when the vehicle seat is subjected to a dynamic load. In other words, the tensioned, interconnected layers create a suspension system with the ability to manage dynamic loads. The vehicle seat includes boundaries incorporating regions of a compliant material, such as foam. This boundary (which may be made of energy-absorbing foam) are attached in the frame of the vehicle seat to enhance vibration damping.

In an aspect of the present disclosure, the vehicle seat includes a seat base and a seatback coupled to the seat base. The seatback includes a rigid frame, a first textile layer attached to the rigid frame, a second textile layer attached to the rigid frame, and at least one textile interconnecting tube coupling the first textile layer to the second textile layer. The textile interconnecting tube is attached in tension between the first textile layer and the second textile layer to dampen dynamic loads applied to the seatback. The rigid frame, the first textile layer, the second textile layer and the textile interconnecting tube may also be part of the seat base instead of (or in addition to the) the seatback.

The rigid frame may include a first side rail and a second side rail spaced apart from each other. The first textile layer is attached in tension between the first side rail and the second side rail to dampen the dynamic loads applied to the seatback. The second textile layer may be attached in tension between the first side rail and the second side rail. The rigid frame includes a first beam and a second beam spaced apart from each other. The first beam may directly interconnect the first side rail and the second side rail. The second beam may directly interconnect the first side rail and the second side rail. The first and second textile layers may both be attached in tension between the first beam and the second beam.

The vehicle seat may further include a third textile layer and a first compliant material coupled to the third textile layer. The third textile layer may be directly attached to the first side rail and the first textile layer to define a first cavity between the first side rail and the third textile layer. The first compliant material may be disposed in the first cavity to dampen the dynamic loads applied to the seatback.

The vehicle seat may further include a fourth textile layer and a second compliant material coupled to the fourth textile layer. The fourth textile layer may be directly attached to the second side rail and the first textile layer to define a second cavity between the second side rail and the fourth textile layer. The second compliant material may be disposed in the second cavity to dampen the dynamic loads applied to the seatback.

The vehicle seat may further include a first rigid mount and a third compliant material directly coupled to the first rigid mount. The first rigid mount may be coupled to the first side rail. Each of the first rigid mount and the third compliant material may be disposed between the first textile layer and the second textile layer.

The first compliant material and the second compliant materials may be softer than the third compliant material to dampen the dynamic load applied to the first textile layer and eventually limit movement of the passenger seated on the vehicle seat in a direction toward the second textile layer.

The vehicle seat may further include a second rigid mount and a fourth compliant material directly coupled to the second rigid mount. The second rigid mount may be coupled to the second side rail. Each of the second rigid mount and the fourth compliant material may be disposed between the first textile layer and the second textile layer.

The first compliant material and the second compliant material may be softer than the fourth compliant material to dampen the dynamic load applied to the first textile layer and eventually limit movement of the passenger seated on the vehicle seat in a direction toward the second textile layer. The first textile layer may be attached in tension between the first rigid mount and the second rigid mount. The first textile layer is subjected to a first tension force, and the second textile layer may be subjected to a second tension force, and the second tension force is greater than the first tension force.

Instead of (or in addition to) the textile interconnecting tube, the vehicle seat may include a plurality of tension elements. Each of the tension elements may be attached in tension between the first textile layer and the second textile layer to dampen dynamic loads applied to the seatback.

The present disclosure also describes a multi-textile suspension structure. The multi-textile suspension structure includes a rigid frame, a first textile layer attached to the rigid frame, a second textile layer attached to the rigid frame and a textile interconnecting element coupling the first textile layer to the second textile layer. The textile interconnection element may be attached in tension between the first textile layer and the second textile. The textile interconnection element may include at least one textile interconnecting tube coupling the first textile layer to the second textile layer. The textile interconnection element includes a plurality of tension elements coupling the first textile layer to the second textile layer.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
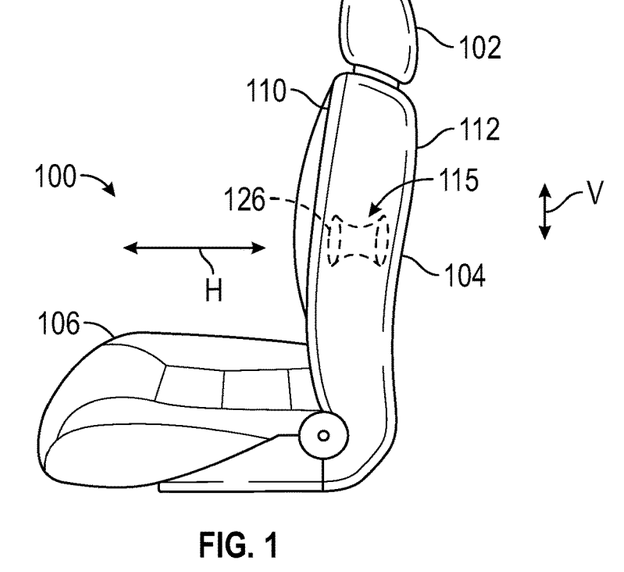
FIG. 1 is a schematic, side view of a seat for a vehicle or another system, wherein the seat includes a headrest, a seatback coupled to the headrest, and a seat base coupled to the seatback.

With reference to FIG. 1, a vehicle seat 100 is configured to dampen dynamic loads. While the vehicle seat 100 may be used in a vehicle, such as a car, it is envisioned that the vehicle seat 100 may also be used in other industries. The vehicle seat 100 includes a headrest 102, a seatback 104 coupled to the headrest 102, and a seat base 106 coupled to the seatback 104. The seat base 106 is configured to support a passenger's buttocks. The headrest 102 is configured to support the passenger's head, and the seatback 104 is configured to support the passenger's back.

Figure 2:
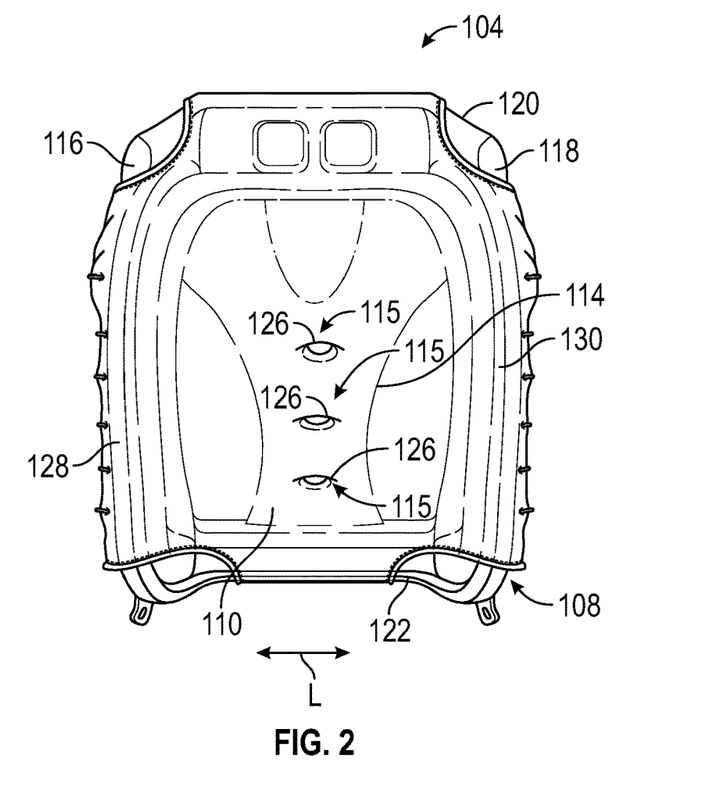
FIG. 2 is a schematic, front view of the seatback of the seat of FIG. 1.
Figure 3:
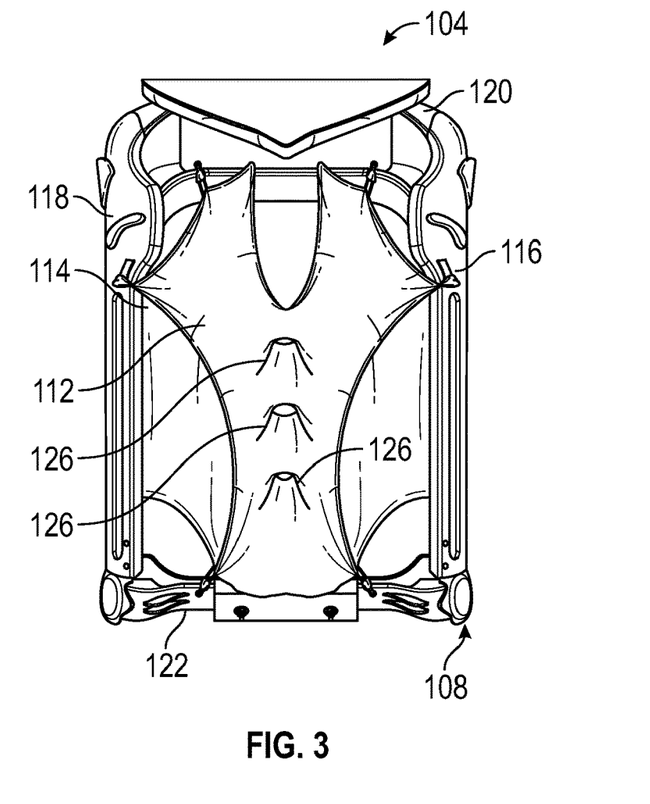
FIG. 3 is a schematic, rear view of the seatback of FIG. 2.
Figure 4:
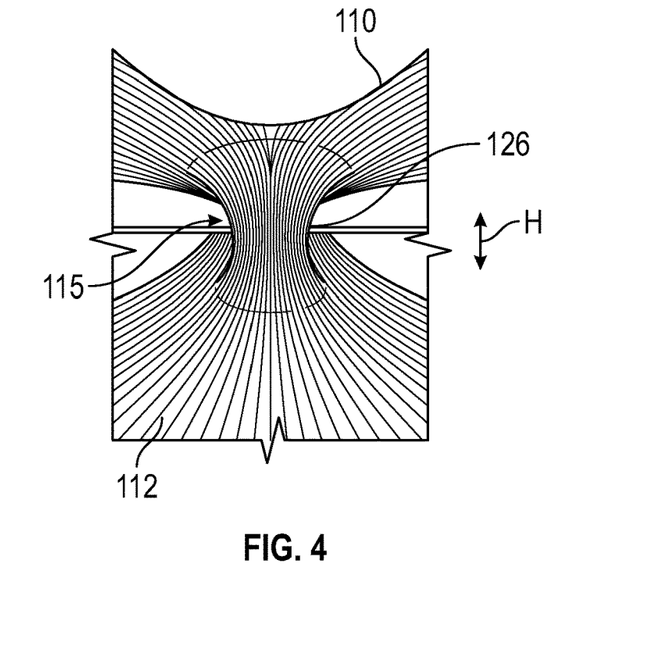
FIG. 4 is a schematic, top view of the seatback, depicting a first textile layer, a second textile layer, and a textile interconnecting tube coupling the first textile layer to the second textile layer.
Figure 5:
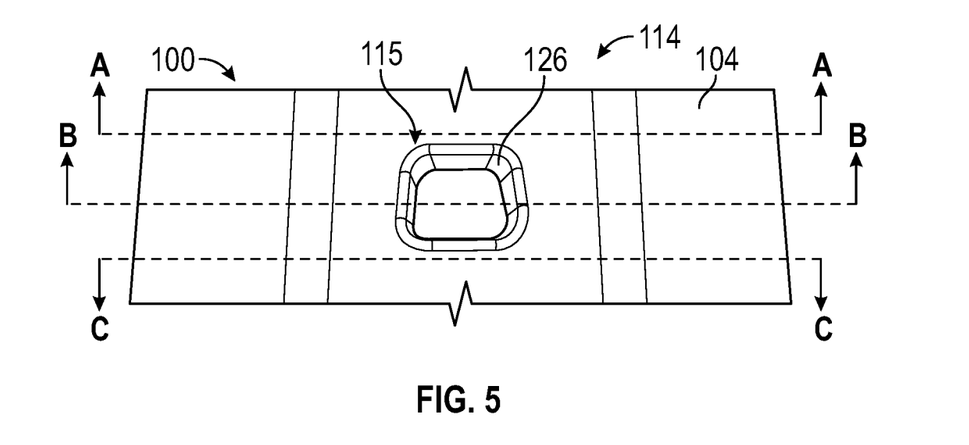
FIG. 5 is a schematic, front view of a portion of the seatback of the seat shown in FIG. 1.
Figure 6:
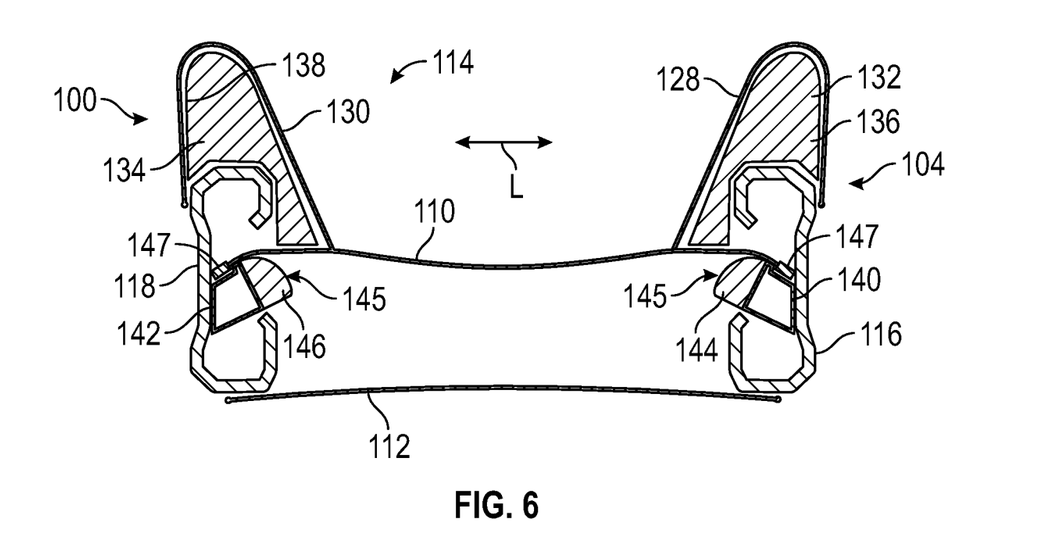
FIG. 6 is a schematic, cross-sectional view of the seatback of the seat of FIG. 1, taken along section line A-A of FIG. 5.
Figure 7:
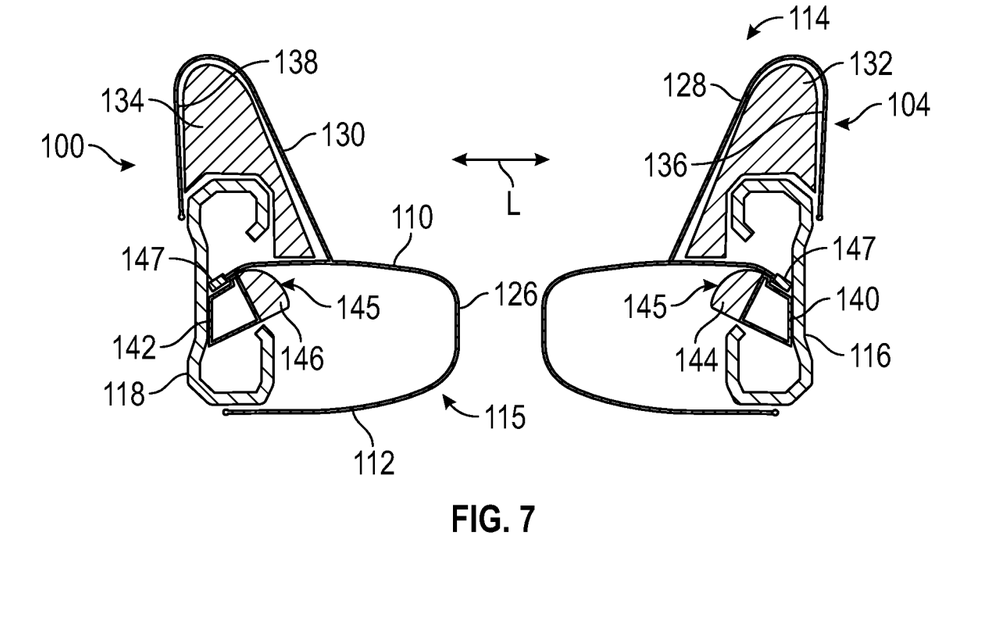
FIG. 7 is a schematic, cross-sectional view of the seatback of the seat of FIG. 1, taken along section line B-B of FIG. 5.
Figure 8:
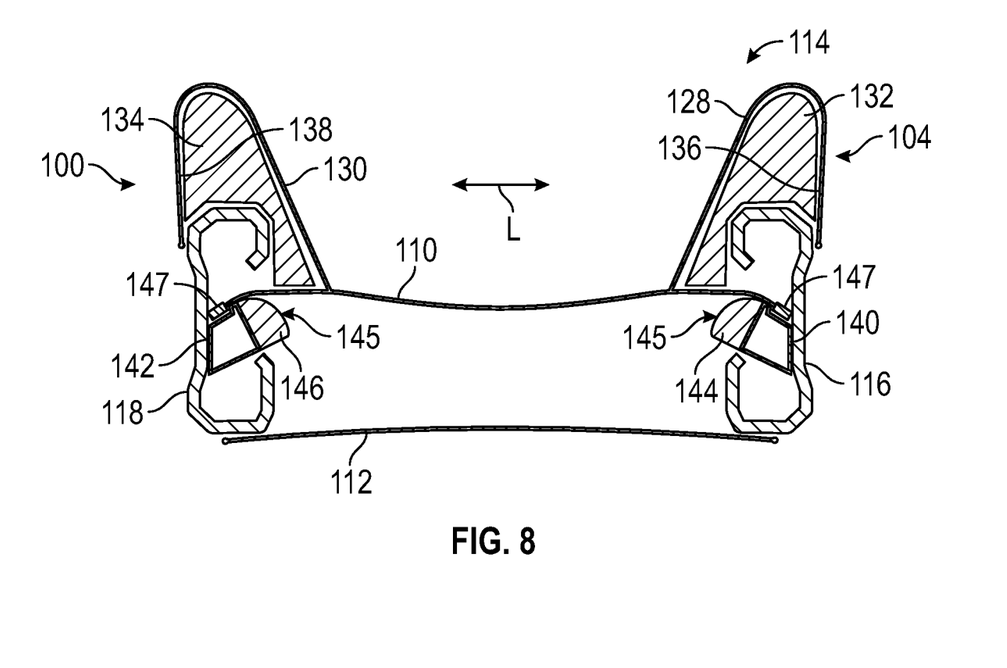
FIG. 8 is a schematic, cross-sectional view of the seatback of the seat of FIG. 1, taken along section line C-C of FIG. 5.

With reference to FIGS. 2-4, the seatback 104 includes a rigid frame 108. The rigid frame 108 may be wholly or partly made of a rigid metallic material and/or a rigid polymeric material. As a non-limiting example, the rigid frame 108 may be wholly or partly made of aluminum or an aluminum alloy. The vehicle seat 100 further includes a first textile layer 110 and a second textile layer 112 spaced apart from the first textile layer 110 in a first direction H (FIG. 1), such as a horizontal direction. The first textile layer 110 may be referred to as the A-layer, and the second textile layer may be referred to as the B-layer. Further, the first textile layer 110 and the second textile layer 112 may be coupled to each other and together form a multi-textile suspension structure 114 configured to manage dynamic loads exerted on the seatback 104. The multi-layer suspension structure 114 may have a Y-shape to minimize costs and the space occupied. It is envisioned, however, that the multi-textile suspension structure 114 may have other shapes. Regardless of the shape of the multi-layer suspension structure 114, each of the first textile layer 110 and the second textile layer 112 is directly attached to the rigid frame 108 to enhance the connection between the multi-layer suspension structure 114 and the rigid frame 108. The rigid frame 108 may also be considered part of the multi-layer suspension structure 114.

The rigid frame 108 further includes a first side rail 116 and a second side rail 118 spaced apart from each other along a second direction L (e.g., a lateral direction). The second direction L is perpendicular to the first direction H. The rigid frame further includes a first beam 120 (i.e., a top beam) and a second beam 122 spaced apart from each other along a third direction V (e.g., a vertical direction). The third direction V is perpendicular to the first direction H and the second direction L. The first beam 120 directly interconnects the first side rail 116 and the second side rail 118 to enhance the structural integrity of the rigid frame 108. Likewise, the second beam 122 directly interconnects the first side rail 116 and the second side rail 118 to enhance the structural integrity of the rigid frame 108.

The first textile layer 110 is attached in tension between the first side rail 116 and the second side rail 118 to dampen dynamic loads applied to the seatback 104. Further, the first textile layer 110 is also attached in tension between the first beam 120 and the second beam 122. Therefore, the first textile layer 110 is in tension in the second direction L and the third direction V to maximize the tension forces in the first textile layer 110 in order to dampen the dynamic loads exerted on the seatback 104. The first textile layer 110 may be directly attached to the first side rail 116 and the second side rail 118 to maximize the tension applied to the first textile layer 110. The second textile layer 112 also prevents additional objects from interacting with the suspended body from the rear or underneath.

The second textile layer 112 is attached in tension between the first side rail 116 and the second side rail 118 to dampen the dynamic loads applied to the seatback 104. Further, the second textile layer 112 is attached in tension between the first beam 120 and the second beam 122 to dampen dynamic loads applied to the seatback 104. Therefore, the second textile layer 112 is in tension in the second direction L and the third direction V to maximize the tension forces in the second textile layer 112 in order to dampen the dynamic loads exerted on the seatback 104.

The multi-textile suspension structure 114 further includes one or more textile interconnection element 115, such as one or more textile interconnecting tube 126, directly coupling the first textile layer 110 and the second textile layer 112. The direct connection among the first textile layer, the textile interconnecting tube 126, and the second textile layer 112 enhances the structural integrity of the multi-textile suspension structure 114. The textile interconnecting tubes 126 are attached in tension between the first textile layer 110 and the second textile layer 112. Specifically, each of the textile interconnecting tubes 126 are in tension in the first direction H. The first direction H is perpendicular to the second direction L and the third direction V. Due to the tension in the textile interconnecting tubes 126, the textile interconnecting tubes 126 buckle when dynamic loads are exerted on the seatback 104 of the vehicle seat 100, thereby dampening the dynamic loads applied to the seatback 104. In the depicted embodiment, each of the textile interconnecting tubes 126 has a substantially cylindrical shape to facilitate manufacturing. However, it is envisioned that the textile interconnecting tubes 126 may have other shapes so long as each of the textile interconnecting tubes 126 forms a hollow body. Each of the textile interconnecting tubes 126 may be open at the first textile layer 110 and at the second textile layer 112 to facilitate bucking when dynamic load are applied to the seatback 104.

As discussed above, each of the first textile layer 110 and the second textile layer 112 is in tension due to the attachment to the rigid frame 108. The tension force (i.e., the first tension force) in the first textile layer 110 is less than the tension force (i.e., the second tension force) in the second textile layer 112 to modulate the dynamic load applied to the first textile layer 110 and eventually limit movement of the passenger seated on the vehicle seat 100 in a direction toward the second textile layer 112. As a non-limiting example, the first tension force may be between twenty-five pounds and forty pounds, and the second tension force may be between fifteen pounds and the thirty pounds to dampen the dynamic load applied to the first textile layer 110, dampen its response to the load, and eventually limit movement of the passenger seated on the vehicle seat 100 in a direction toward the second textile layer 112.

With reference to FIGS. 5-8, the seatback 104 of the vehicle seat 100 includes a third textile layer 128 and a fourth textile layer 130 spaced apart from each other along the second direction L. The seatback 104 further includes a first compliant material 132, such as foam, and a second compliant material 134, such as foam. The first compliant material 132 is coupled to the third textile layer 128, and the second compliant material 134 coupled to the fourth textile layer 130. For example, the third textile layer 128 may be laid over the first compliant material 132, and the fourth textile layer 130 may be laid over the second compliant material 134. A layer of trim may be disposed between the first compliant member 132 and the third textile layer 128. Another layer of trim may be disposed between the second compliant member 134. The third textile layer 128 is directly attached to the first side rail 116 and the first textile layer 110 to define a first cavity 136. The first cavity 136 is disposed between the first side rail 116 and the third textile layer 128 to dampen dynamic loads applied to the seatback 104. The third textile layer 128 is attached in tension between the first side rail 116 and the first textile layer 110 to dampen dynamic loads exerted on the seatback 104. Thus, the third textile layer 128 is subjected to a third tension force. The third tension force of the third textile layer 128 is less than the first tension force of the first textile layer 110 and the second tension force of the second textile layer 112 to dampen dynamic loads applied to the seatback 104 and eventually limit movement of the passenger seated on the vehicle seat 100 in a direction toward the second textile layer 112. As a non-limiting example, the third tension force of the third textile layer 128 may be five pounds to dampen the dynamic loads.

The second compliant material 134 is coupled to the fourth textile layer 130. The fourth textile layer 130 is directly attached to the second side rail 118 and the first textile layer 110 to define a second cavity 138. The second cavity 138 is disposed between the second side rail 118 and the fourth textile layer 130. The second compliant material 134 is disposed in the second cavity 138 to dampen dynamic loads applied to the seatback 104. The fourth textile layer 130 is attached in tension between the second side rail 118 and the first textile layer 110 to dampen dynamic loads exerted on the seatback 104. Thus, the fourth textile layer 130 is subjected to a fourth tension force. The fourth tension force of the fourth textile layer 130 is less than the first tension force of the first textile layer 110 and the second tension force of the second textile layer 112 to dampen dynamic loads applied to the seatback 104 and eventually limit movement of the passenger seated on the vehicle seat 100 in a direction toward the second textile layer 112. As a non-limiting example, the fourth tension force of the fourth textile layer 130 may be five pounds to dampen the dynamic loads.

The seatback 104 of the vehicle seat 100 further includes a first rigid mount 140 directly coupled to the first side rail 116. The first rigid mount 140 is disposed between the first textile layer 110 and the second textile layer 112. Further, the first rigid mount 140 may be wholly or partly made of a rigid material 146, such as a rigid metallic material and/or a rigid polymeric material.

The seatback 104 of the vehicle seat 100 further includes a second rigid mount 142 directly coupled to the second side rail 118. The second rigid mount 142 is disposed between the first textile layer 110 and the second textile layer 112. Further, the second rigid mount 142 may be wholly or partly made of a rigid material, such as a rigid metallic material and/or a rigid polymeric material.

The seatback 104 further includes a third compliant material 144, such as foam, directly coupled to the first rigid mount 140. In addition, the seatback 104 includes a fourth compliant material, such as foam, directly coupled to the second rigid mount 142. Each of the first compliant material 132 and the second compliant material 134 is softer than the third compliant material 144 and the fourth compliant material 146 to dampen the dynamic load applied to the first textile layer 110 and eventually limit movement of the passenger seated on the vehicle seat 100 in a direction toward the second textile layer 112. In the present disclosure, the terms "soft" and "softer" refer to the ability of a material or a system to absorb and recover from an impact to an object without fundamental changes in function or structure. Each of the third compliant material 144 and the fourth compliant material 146 may have an outer curved surface 145 to facilitate movement of the passenger seated on the vehicle seat 100 toward the second textile layer 112. The second textile layer 112 may be coupled to the first rigid mount 140 and the second rigid mount 142 by attachment features 147, such as a fastener.

Figure 9:
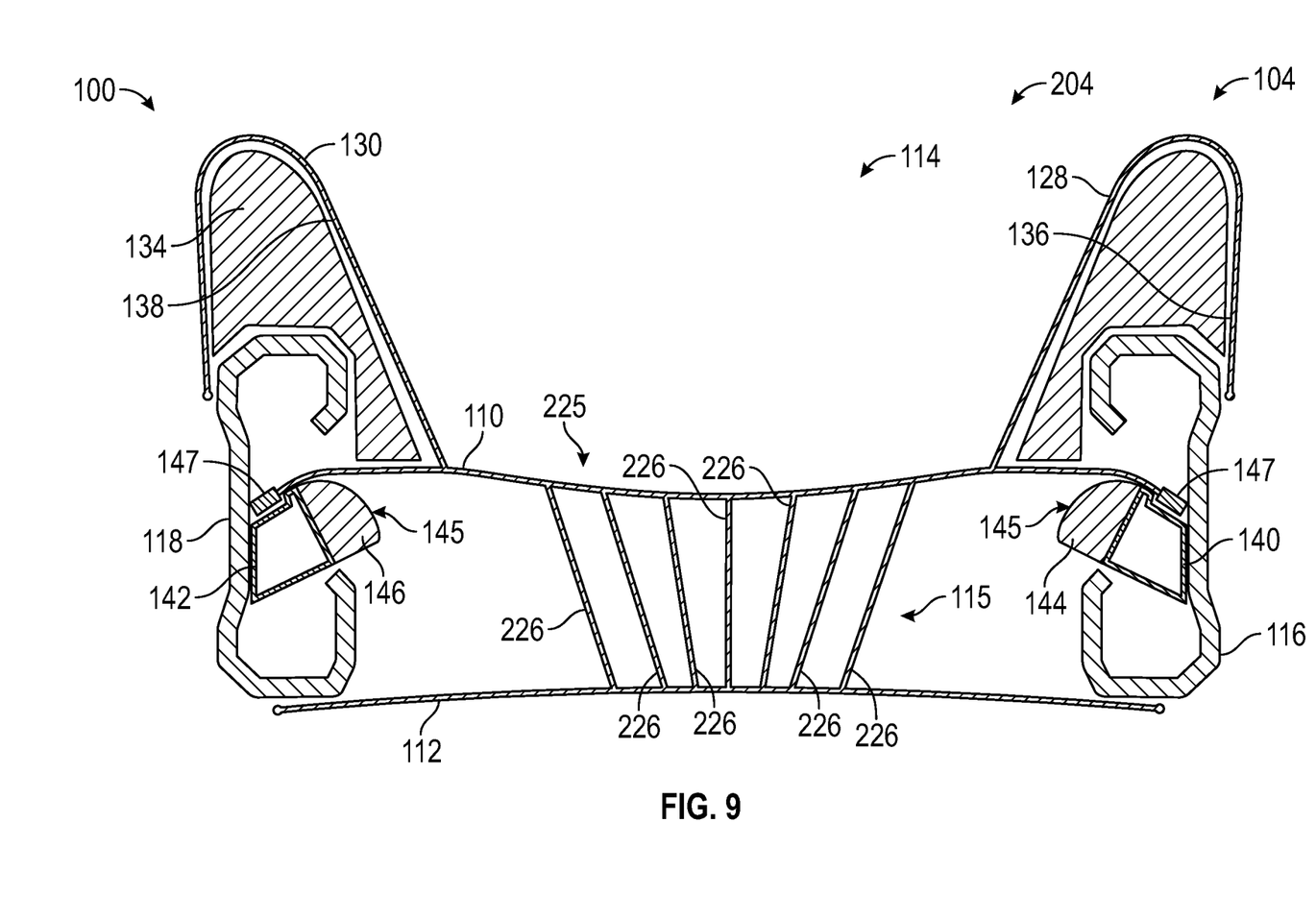
FIG. 9 is a schematic, cross-sectional view of the seatback in accordance with another aspect of the present disclosure.

With reference to FIG. 9, the structure and operation of a seatback 204 is substantially identical to the seatback 104 described above, except for the features described below. Instead of (or in addition to) the textile interconnecting tubes 126 (FIG. 5), the seatback 204 includes one or more textile interconnection element 115, such as a plurality of tension elements 226, attached in tension between the first textile layer 110 and the second textile layer 112 to dampen dynamic loads applied to the seatback 204. Each of the tension elements 226 is directly attached to the first textile layer 110 to enhance the damping properties of the seatback 204. Similarly, each of the tension elements 226 is directly attached to the second textile layer 112 to enhance the damping properties of the seatback 204. In the depicted embodiment, each of the tension elements 226 is obliquely angled relative to the first textile layer 110 and the second textile layer 112 to help distribute dynamic forces exerted on the seatback 204. The tension elements 226 may be located in a central region 225 of the seatback 204 spaced apart from the first side rail 116 and the second side rail 118. The seatback 104 described above may be manufactured using a 3D knitting process. As non-limiting examples, the tension elements 226 may be tethers, strings, filaments, and/or ribbons.

Figure 10:
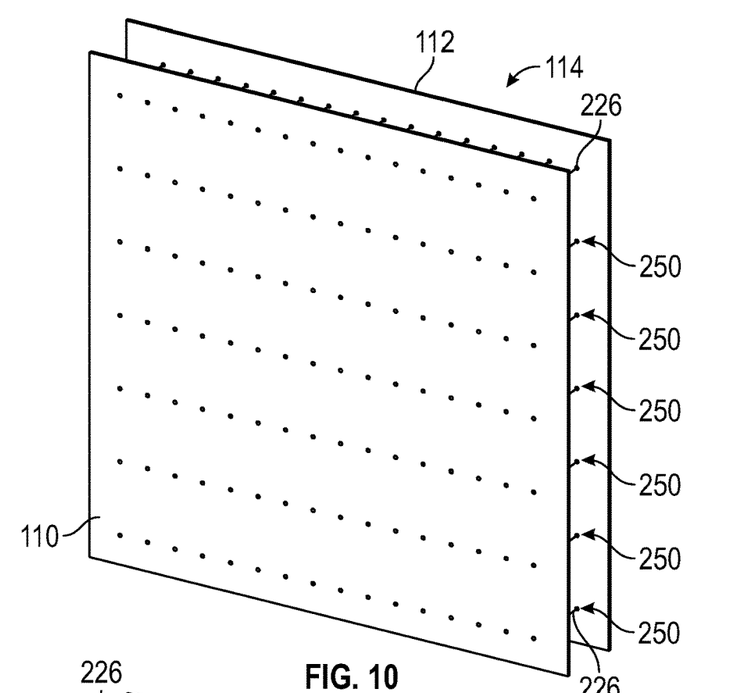
FIG. 10 is a schematic, perspective view of the seatback of FIG. 9, depicting a first textile layer, a second textile layer, and a plurality of tension elements interconnecting the first textile layer and the second textile layer.
Figure 11:
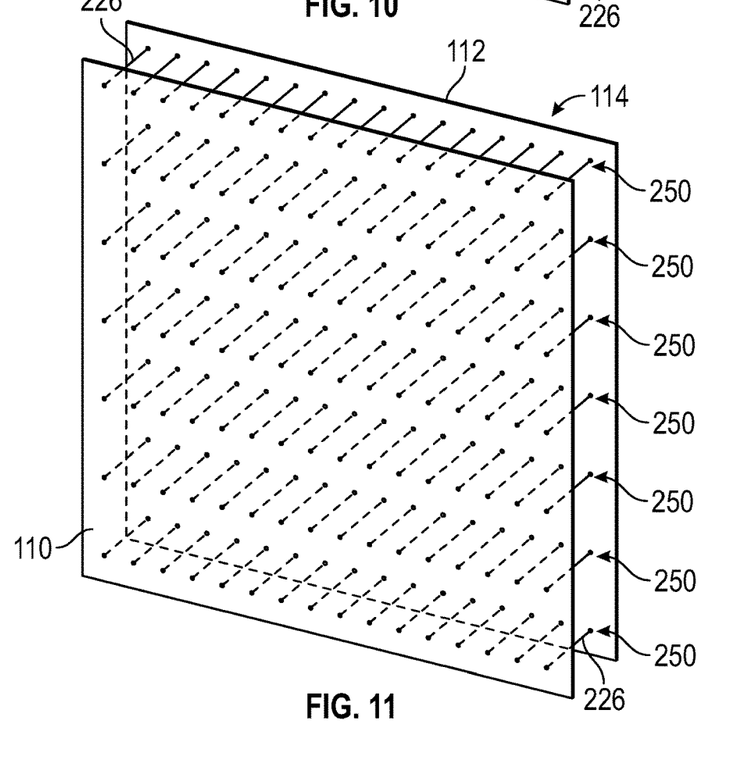
FIG. 11 is a schematic, perspective view of the seatback of FIG. 9, depicting a first textile layer, a second textile layer, and a plurality of tension elements interconnecting the first textile layer and the second textile layer, wherein the tension elements are shown in hidden lines.

With reference to FIGS. 10 and 11, the tension elements 226 interconnect the first textile layer 110 and the second textile layer 112. The first textile layer 110 may be referred to as the front textile layer, and the second textile layer 112 may be referred to as the rear textile layer. As a non-limiting example, the tension elements 226 may be arranged orthogonal to the first textile layer 110 and the second textile layer 112. Alternatively, the tension elements 2226 may run at angles, be non-parallel, and/or be randomly distributed. Further, the tension elements 226 may be arranged in multiple tether rows 250 parallel to each other.

Figure 12A:
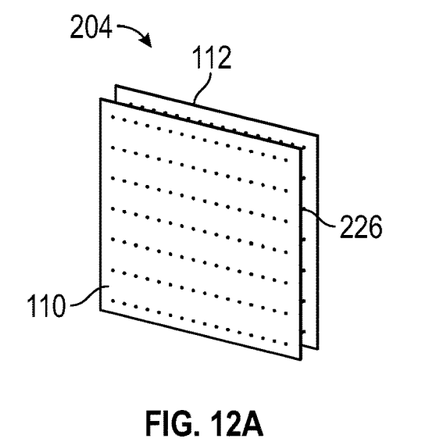
FIG. 12A is a schematic, perspective view illustrating a first step of a method for manufacturing the seatback of FIG. 10.
Figure 12B:
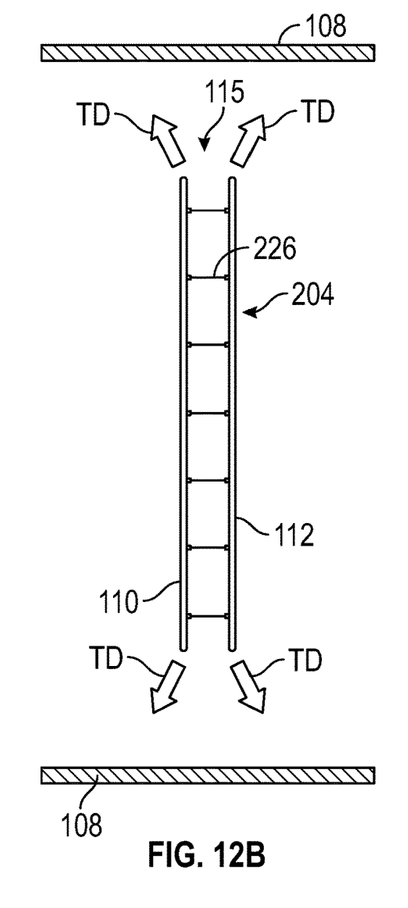
FIG. 12B is a schematic, side view illustrating the first step of the method for manufacturing the seatback of FIG. 10.

FIGS. 12A, 12B, 12C, and 12D illustrate a method for manufacturing the seatback 204. The first step of this method is illustrated in FIGS. 12A and 12B. In the first step, the tension elements 226 are directly connected to the first textile layer 110 and the second textile layer 112. It is also envisioned that the tension elements 226, the first textile layer 110, and the second textile layer 112 may be manufacturing simultaneously in the same knitting pass. Once the tension elements 226 are connected to the first textile layer 110 and the second textile layer 112, the first textile layer 110 and the second textile layer 112 are stretched in the tension directions TD to connect the first textile layer 110 and the second textile layer 112 to the rigid frame 108. No tether 226 are directly connected to the rigid frame 108. Once stretched, the first textile layer 110 connected to the rigid frame 108 at four attachment points 244, and the second textile layer 112 is also attached to the rigid frame 108 at four attachment points 244. As a consequence, the first textile layer 110 and the second textile layer 112 are maintained in a stretched condition. Instead of (or in addition to) the four attachment points 244, the first textile layer 110 and the second textile layer 112 may be connected in spans, either continuous or discontinuous. Also, each of the first textile layer 110 and the second textile layer 112 is in tension along the second direction L, and the tension elements 226 are in tension in the first direction H.

Figure 13:
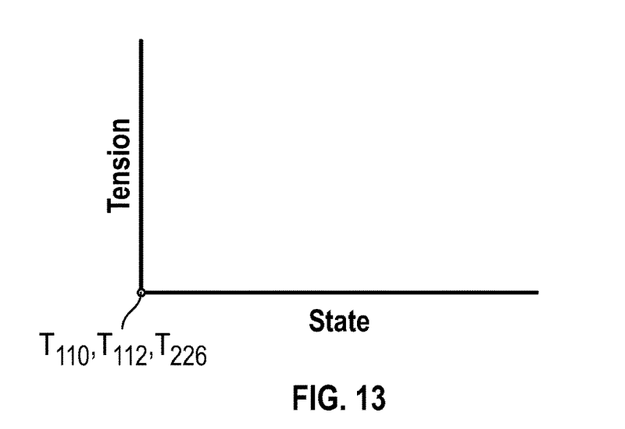
FIG. 13 is a graph of tension versus state when the seatback is in an unloaded state as shown in FIG. 12B.

FIG. 13 is a graph of tension version state when the seatback 204 is in an unloaded state as shown in FIG. 12B. In the unloaded state, the seatback 204 is has not been stretched, and each of the tension $T_{110}$ of the first textile layer 110, the tension $T_{112}$ of the second textile layer 112, and the tension $T_{226}$ of the tension elements 226 is zero.

Figure 12C:
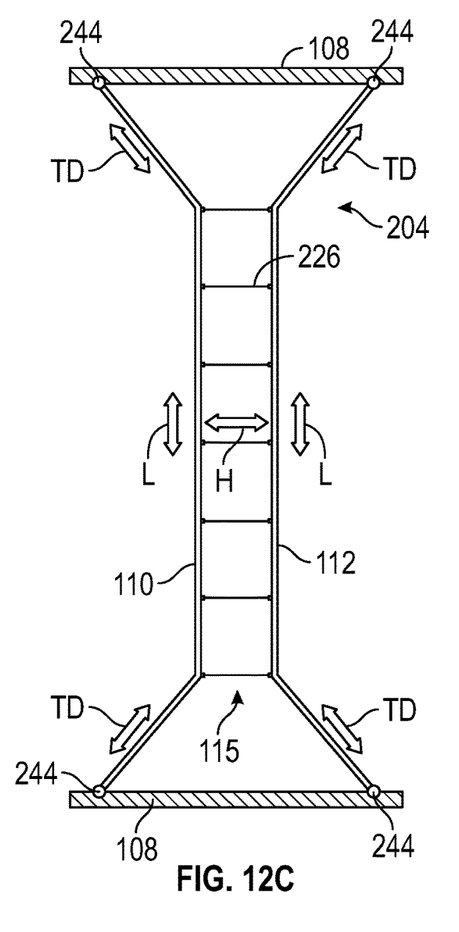
FIG. 12C is a schematic, side view illustrating a second step of the method for manufacturing the seatback of FIG. 10.
Figure 12D:
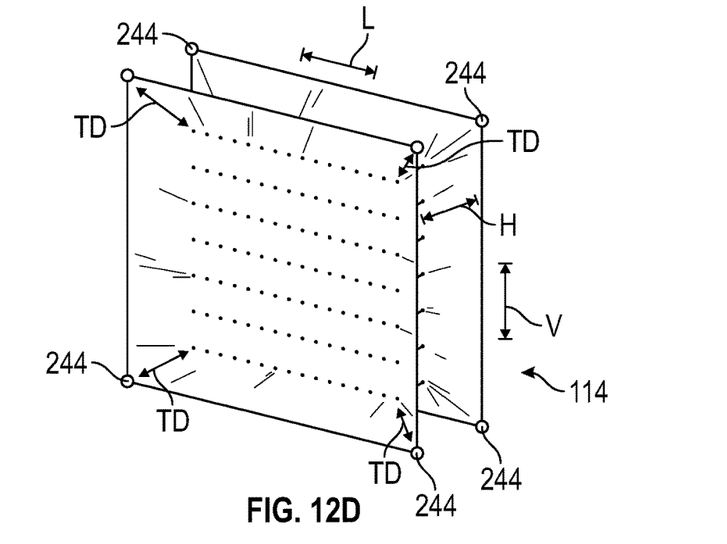
FIG. 12D is a schematic, perspective view illustrating the second step of the method for manufacturing the seatback of FIG. 10.
Figure 14:
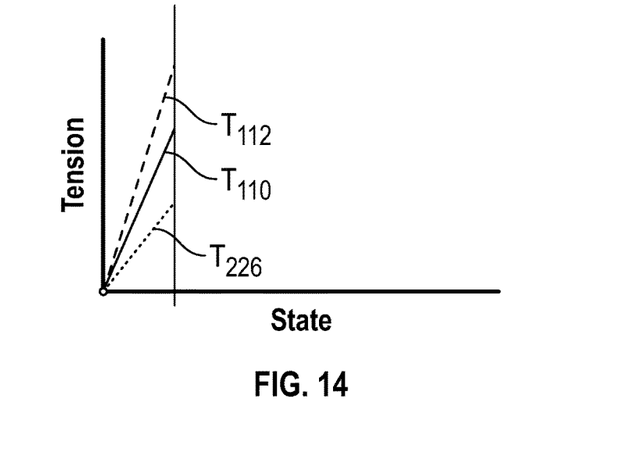
FIG. 14 is a graph of tension versus state when the seatback is in a nominal state after installation as shown in FIG. 12C.

FIG. 14 is a graph of tension versus state when the seatback 204 is in the nominal state after installation as shown in FIG. 12C. In this nominal state after installation, the tension $T_{112}$ of the second textile layer 112 is greater than the tension $T_{110}$ of the first textile layer 110, and the tension $T_{110}$ of the first textile layer 110 is greater than the tension $T_{226}$ of the tension elements 226.

Figure 15:
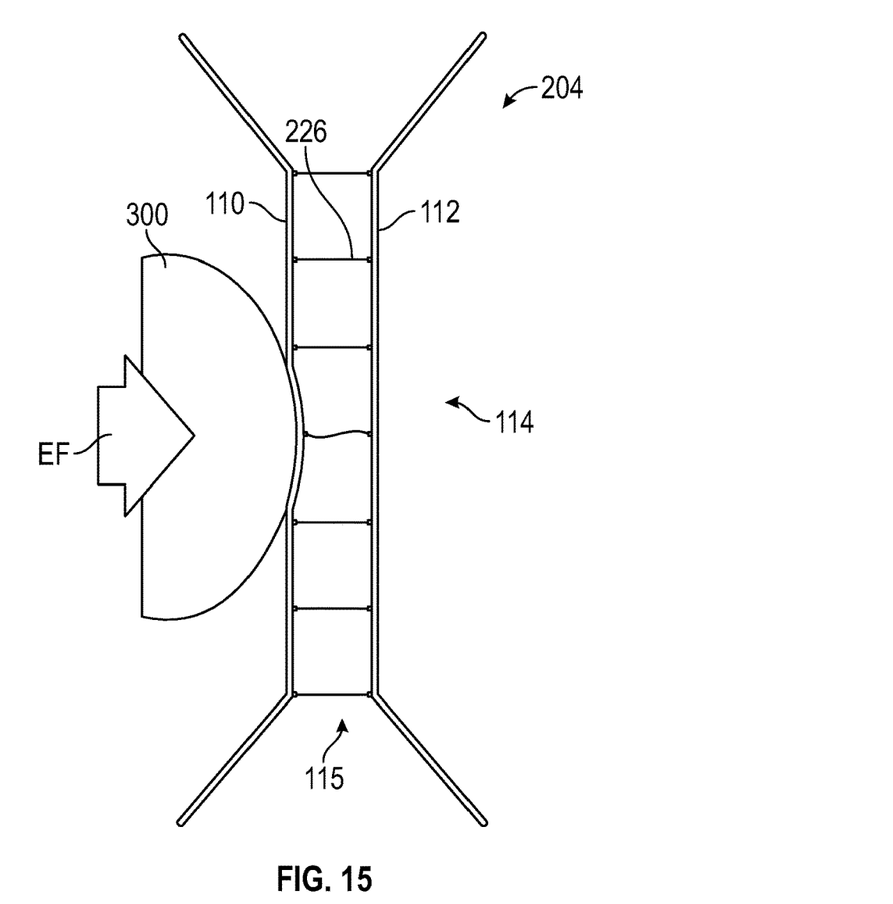
FIG. 15 is a schematic, side view of an external body moving and contacting the seatback of FIG. 10.
Figure 16:
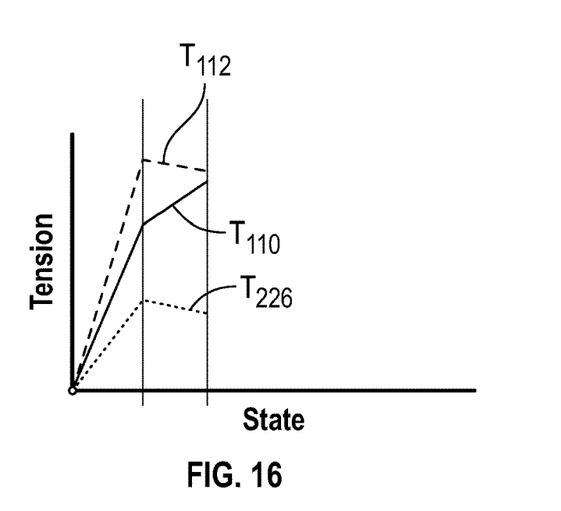
FIG. 16 is a graph of tension versus state when the seatback is being contacted by an external body.

FIGS. 15 and 16 show an external body 300 moving and contacting the seatback 204. As the external body 300 makes contact with the seatback 204, it applies an external force EF to the seatback 204 and stretches the first textile layer 110, thereby increasing its tension. This relieves some of the tension within the tension elements 226 and the second textile layer 112 as shown in FIG. 16. These general tensioning trends continue as the external body 300 moves forward into the seatback 204. Alternatively, the external body 300 may already be in contact with the multi-textile suspension structure 114 in equilibrium. Then, there could be a jounce input to the body and the same sort of suspension behavior would play out.

Figure 17:
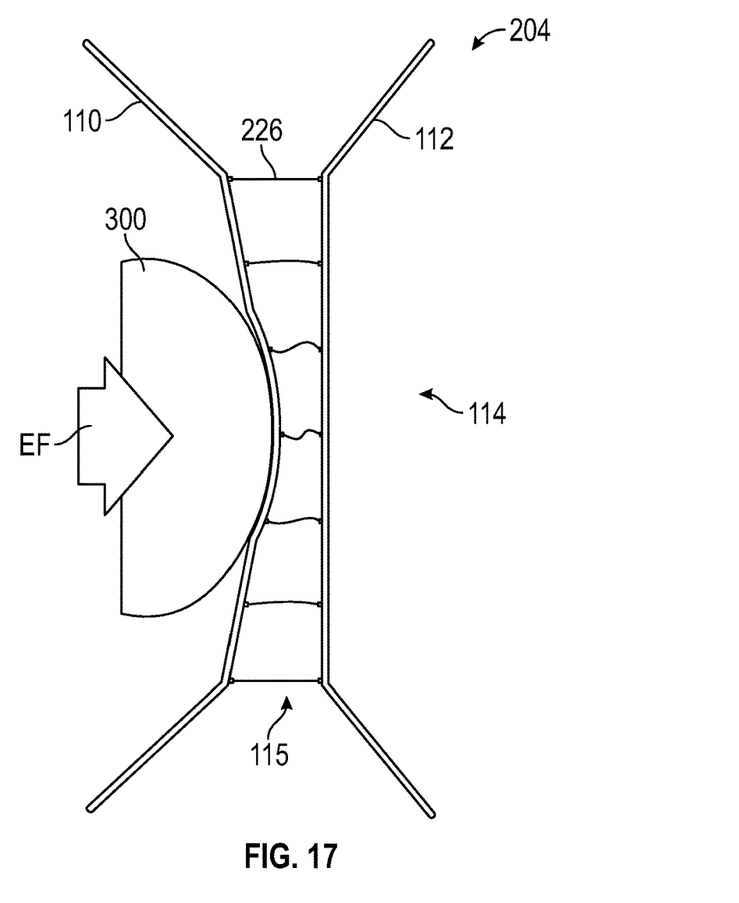
FIG. 17 is a schematic, side view of the external body once it is stopped by the seatback of FIG. 10.
Figure 18:
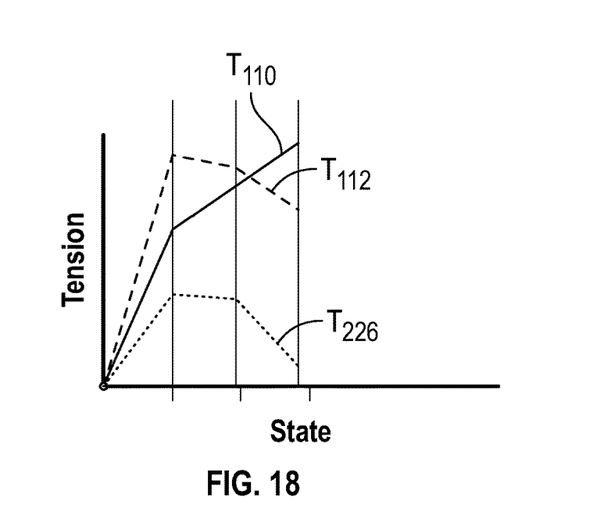
FIG. 18 is a graph of tension versus state when the external body is stationary.

FIGS. 17 and 18 show the external body 300 being stopped by the seatback 204. At this stage, the first textile layer 110 is at its peak tension. Most of the tension elements 226 may be slack, with a few tension elements 226 still pulling on the second textile layer 112. The second textile layer 112 relaxes more significantly. The tension $T_{110}$ in the first textile layer 110 is unbalanced and will begin recovering, reversing the initial movement of the external body 300.

Figure 19:
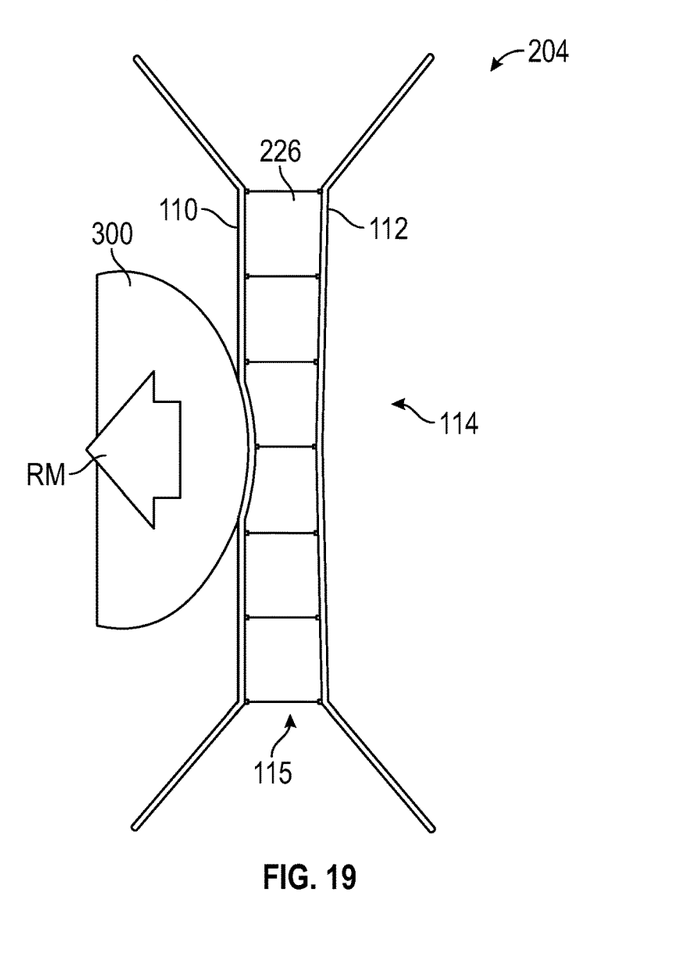
FIG. 19 is a schematic, side view of the external body once the external body is moving away from the first textile layer of the seatback of FIG. 10.
Figure 20:
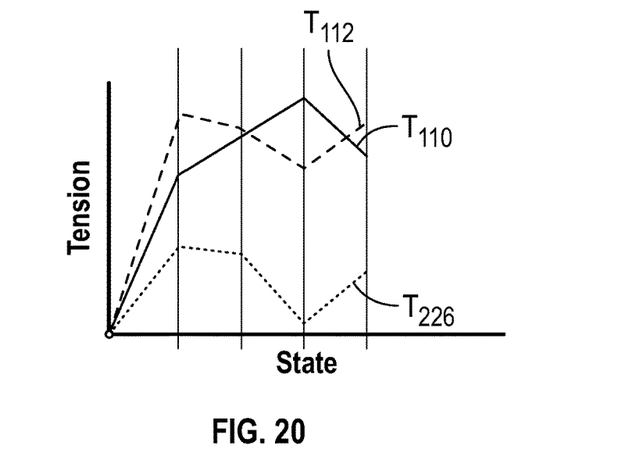
FIG. 20 is a graph of tension versus state once the external body is moving away from the first textile layer of the seatback of FIG. 10.

FIGS. 19 and 20 show the external body 300 moving away from the seatback 204 (in the direction RM). As the first textile layer 110 recovers, more of the tension elements 226 begin to become taught. This increases the tension $T_{112}$ in the second textile layer 112, moving it backwards towards its equilibrium position. The release of the stored energy within the first textile layer 110 feeding into the re-tensioning of the tension elements 226 and the second textile layer 112 is an extra path for energy dissipation that other tensioned membranes do not have. This allows the seatback 204 to dissipate dynamic excitation in a more effective and tailored manner.

Figure 21:
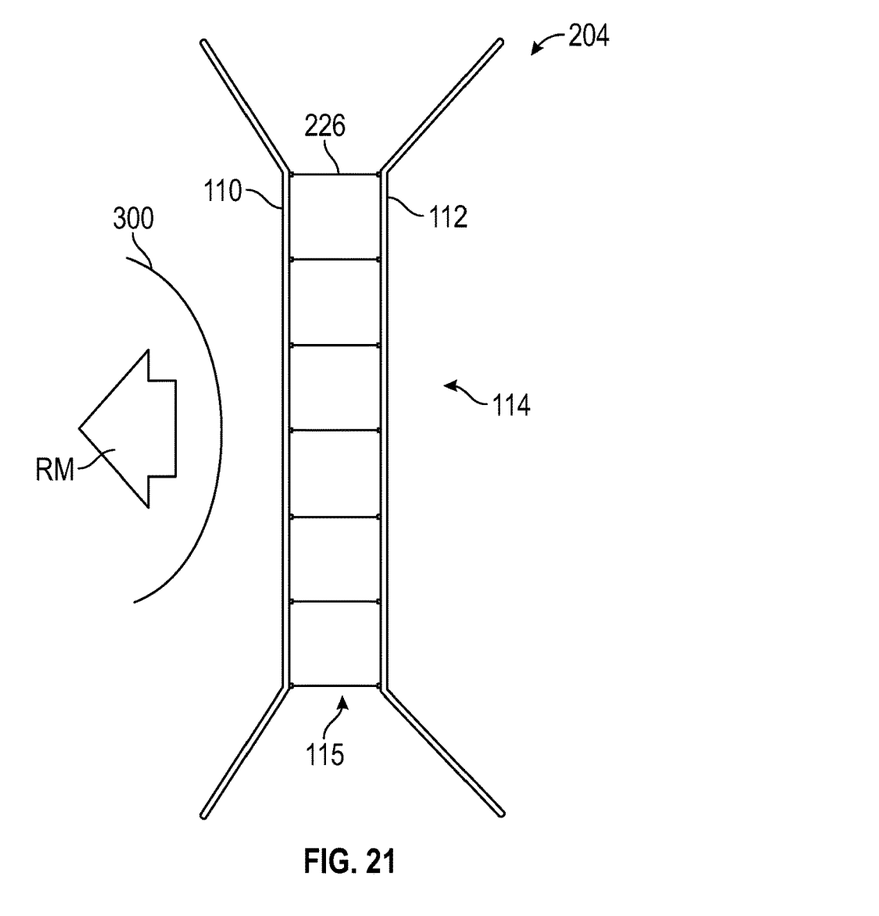
FIG. 21 is a schematic, side view of the seatback when the external body is no longer in contact with the seatback of FIG. 10.
Figure 22:
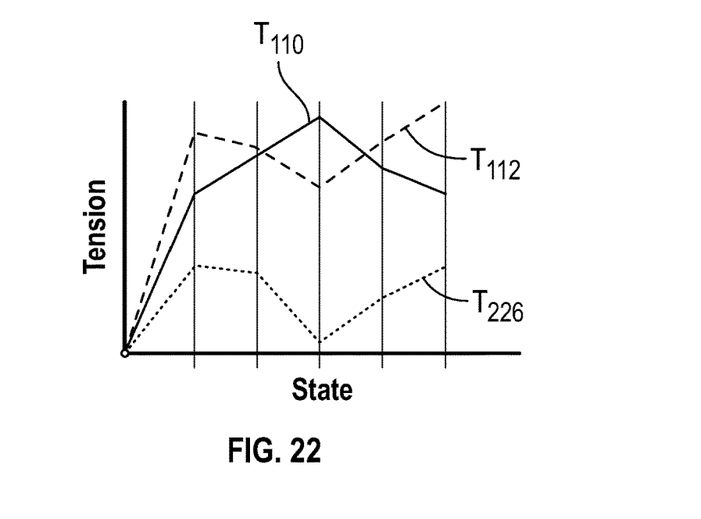
FIG. 22 is a graph of tension versus state once the external body is no longer in contact with the seatback of FIG. 10.

FIGS. 21 and 22 show that the external body 300 is no longer in contact with the seatback 204. The tension in the first textile layer 110 drops to the lowest point since installation as it rebounds past the equilibrium position. The tension elements 226 are now highly tensioned, thereby pulling the second textile layer 112 to its peak tension and also past its equilibrium position. Once still, the seatback 204 will again head back toward equilibrium. A dynamically excited tensioned seatback 204 will oscillate around equilibrium as its vibrations dampen out. The seatback 204 has parameters that can be selected to be less responsive to excitation from targeted frequency ranges to reduce or eliminate these oscillations. Although the oscillations are not shown, it is envision that the multi-textile suspension structure 114 may oscillate while subjected to dynamic loads.

Figure 23:
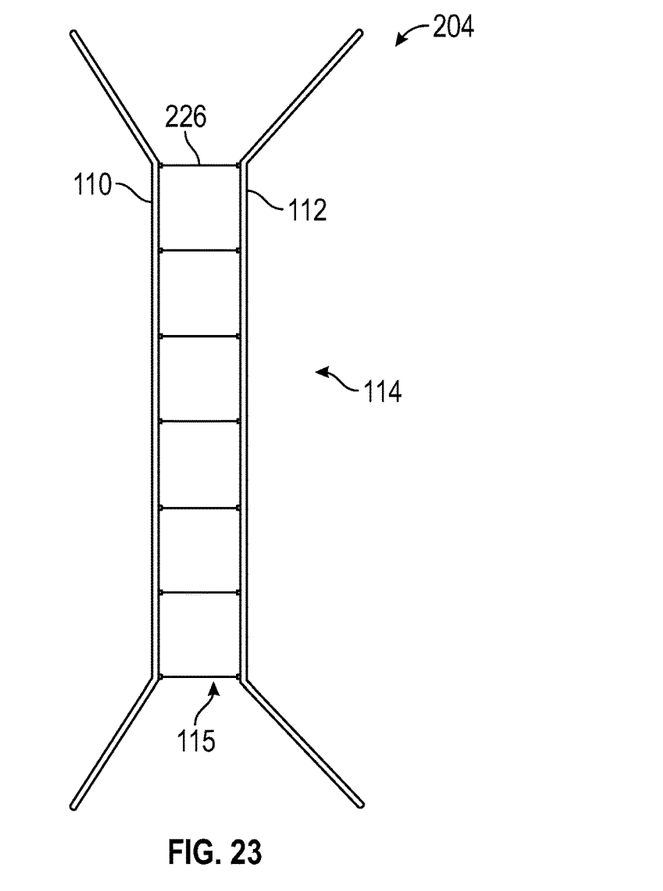
FIG. 23 is a schematic, side view of the seatback of FIG. 10, which is in equilibrium after the external force has been applied by the external body.
Figure 24:
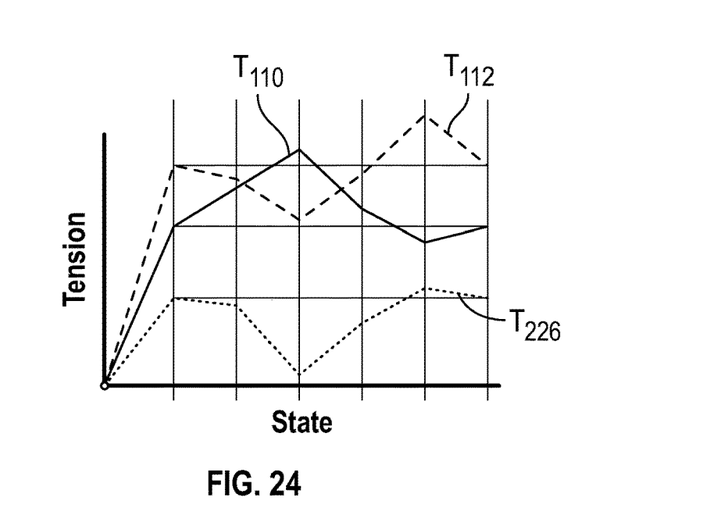
FIG. 24 is a graph of tension versus state once the seatback of FIG. 10 is in equilibrium after the external force has been applied by the external body.

FIGS. 23 and 24 show the seatback 204 in equilibrium after the external force EF has been applied by the external body 300. If the seatback 204 is undamaged during the event, the seatback 204 eventually returns to equilibrium. The interplay and energy exchange between the basic elements of the seatback 204 provide additional avenues for engineering the dynamic response of the multi-layer seatback 204 in comparison with single layer textiles. By properly selecting the individually layered constructions, yarn/filaments composition, installation tensions, boundary conditions, among others, the multi-layer textile seatback 204 can be tailored for many dynamic conditions and applications, from noise abatement to ride comfort to cargo containment. As discussed above, the external body 300 may be at rest and in contact with the multi-textile suspension structure 114. In this case, the external body 300 and the multi-textile suspension structure 114 will return to the original state (after a jounce input) with the external body 300 in contact with the first textile layer 110.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A vehicle seat, comprising:
   a seat base;
   a seatback coupled to the seat base, wherein the seatback includes:
      a rigid frame;
      a first textile layer attached to the rigid frame;
      a second textile layer attached to the rigid frame;
      at least one textile interconnecting tube coupling the first textile layer to the second textile layer; and
      wherein the at least one textile interconnecting tube is attached in tension between the first textile layer and the second textile layer to dampen dynamic loads applied to the seatback.

2. The vehicle seat of claim 1, wherein the rigid frame includes a first side rail and a second side rail spaced apart from each other, and the first textile layer is coupled in tension between the first side rail and the second side rail to dampen the dynamic loads applied to the seatback.

3. The vehicle seat of claim 2, wherein the second textile layer is attached in tension between the first side rail and the second side rail.

4. The vehicle seat of claim 3, wherein the rigid frame includes a first beam and a second beam spaced apart from each other, the first beam directly interconnects the first side rail and the second side rail, the second beam directly interconnects the first side rail and the second side rail, and the second textile layer is attached in tension between the first beam and the second beam.

5. The vehicle seat of claim 4, further comprising a third textile layer and a first compliant material coupled to the third textile layer, wherein the third textile layer is directly attached to the first side rail and the first textile layer to define a first cavity between the first side rail and the third textile layer, and the first compliant material disposed in the first cavity to dampen the dynamic loads applied to the seatback.

6. The vehicle seat of claim 5, further comprising a fourth textile layer and a second compliant material coupled to the fourth textile layer, wherein the fourth textile layer is directly attached to the second side rail and the first textile layer to define a second cavity between the second side rail and the fourth textile layer, and the second compliant material is disposed in the second cavity to dampen the dynamic loads applied to the seatback.

7. The vehicle seat of claim 6, further comprising a first rigid mount and a third compliant material directly coupled to the first rigid mount, the first rigid mount is coupled to the first side rail, each of the first rigid mount and the third compliant material is disposed between the first textile layer and the second textile layer.

8. The vehicle seat of claim 7, wherein the first compliant material and the second compliant material are softer than the third compliant material to dampen the dynamic load applied to the first textile layer and eventually limit movement of a passenger seated on the vehicle seat in a direction toward the second textile layer.

9. The vehicle seat of claim 8, further comprising a second rigid mount and a fourth compliant material directly coupled to the second rigid mount, the second rigid mount is coupled to the second side rail, and each of the second rigid mount and the fourth compliant material is disposed between the first textile layer and the second textile layer.

10. The vehicle seat of claim 9, wherein the first compliant material and the second compliant materials are softer than the fourth compliant material to dampen the dynamic load applied to the first textile layer and eventually limit movement of the passenger seated on the vehicle seat in a direction toward the second textile layer.

11. The vehicle seat of claim 10, wherein the first textile layer is attached in tension between the first rigid mount and the second rigid mount.

12. The vehicle seat of claim 11, wherein the first textile layer is subjected to a first tension force, and the second textile layer is subjected to a second tension force, and the second tension force is greater than the first tension force.

13. A vehicle seat, comprising:
   a seat base;
   a seatback coupled to the seat base, wherein the seatback includes:
      a rigid frame;
      a first textile layer attached to the rigid frame;
      a second textile layer attached to the rigid frame;
      a plurality of tension elements coupling the first textile layer to the second textile layer; and
      wherein each of the plurality of tension elements is attached in tension between the first textile layer and the second textile layer to dampen dynamic loads applied to the seatback.

14. The vehicle seat of claim 13, wherein the rigid frame includes a first side rail and a second side rail spaced apart from each other, and the first textile layer is attached in tension between the first side rail and the second side rail to dampen the dynamic loads applied to the seatback.

15. The vehicle seat of claim 14, wherein the second textile layer is attached in tension between the first side rail and the second side rail, the rigid frame includes a first beam and a second beam spaced apart from each other, the first beam directly interconnects the first side rail and the second side rail, and the second beam directly interconnects the first side rail and the second side rail, and the second textile layer is attached in tension between the first beam and the second beam, the vehicle seat further includes a third textile layer and a first compliant material coupled to the third textile layer, wherein the third textile layer is directly attached to the first side rail and the first textile layer to define a first cavity between the first side rail and the third textile layer, and the first compliant material disposed in the first cavity to dampen the dynamic loads applied to the seatback.

16. The vehicle seat of claim 15, further comprising a fourth textile layer and a second compliant material coupled to the fourth textile layer, wherein the fourth textile layer is directly attached to the second side rail and the first textile layer to define a second cavity between the second side rail and the fourth textile layer, and the second compliant material is disposed in the second cavity to dampen the dynamic loads applied to the seatback, the vehicle seat further includes a first rigid mount and a third compliant material directly coupled to the first rigid mount, and the first rigid mount is coupled to the first side rail, each of the first rigid mount and the third compliant material is disposed between the first textile layer and the second textile layer.

17. The vehicle seat of claim 16, wherein the first compliant material and the second compliant materials are softer than the third compliant material to dampen the dynamic load applied to the first textile layer and eventually limit movement of the passenger seated on the vehicle seat in a direction toward the second textile layer, the vehicle seat further includes a second rigid mount and a fourth compliant material directly coupled to the second rigid mount, the second rigid mount is coupled to the second side rail, each of the second rigid mount and the fourth compliant material is disposed between the first textile layer and the second textile layer, the first compliant material and the second compliant materials are softer than the fourth compliant material to dampen the dynamic load applied to the first textile layer and eventually limit movement of the passenger seated on the vehicle seat in a direction toward the second textile layer, the first textile layer is attached in tension between the first rigid mount and the second rigid mount, and the first textile layer is subjected to a first tension force, and the second textile layer is subjected to a second tension force, and the second tension force is greater than the first tension force.

* * * * *